United States Patent [19]

Suzuki et al.

[11] Patent Number: 5,281,671

[45] Date of Patent: * Jan. 25, 1994

[54] ABRASION-RESISTANT RUBBER COMPOSITIONS

[75] Inventors: Fumitoshi Suzuki, Yokohama; Yoshihiro Chino, Koshigaya; Shuichi Akita, Yokohama, all of Japan

[73] Assignees: Nippon Zeon Co., Ltd.; The Yokohama Rubber Co., Ltd., both of Tokyo, Japan

[*] Notice: The portion of the term of this patent subsequent to Jun. 15, 2010 has been disclaimed.

[21] Appl. No.: 626,138

[22] Filed: Dec. 12, 1990

[30] Foreign Application Priority Data

Dec. 20, 1989 [JP] Japan .................. 1-330664

[51] Int. Cl.$^5$ .................... C08F 8/00; C08L 7/00
[52] U.S. Cl. .................... 525/212; 525/215; 525/217; 525/236; 525/237; 525/333.2; 525/420; 525/432; 525/436
[58] Field of Search ........... 525/215, 212, 217, 236, 525/237, 420, 432, 436

[56] References Cited

U.S. PATENT DOCUMENTS

| 4,824,900 | 4/1989 | Sakurai ........... 524/495 |
| 4,950,719 | 8/1990 | Oyama et al. ........... 525/217 |
| 5,017,636 | 5/1991 | Hattori et al. ........... 524/300 |

FOREIGN PATENT DOCUMENTS

| 150479 | 8/1985 | European Pat. Off. . |
| 4015612 | 11/1990 | Fed. Rep. of Germany . |
| 100146 | 12/1980 | Japan . |
| 59-45337 | 3/1984 | Japan . |
| 60-197749 | 10/1985 | Japan . |
| 1-21234 | 5/1989 | Japan . |

Primary Examiner—Paul R. Michl
Assistant Examiner—Olga Asinovsky
Attorney, Agent, or Firm—Lowe, Price, LeBlanc & Becker

[57] ABSTRACT

An abrasion-resistant rubber composition comprises as rubber components (A) 30-95 wt. % of an end-modified butadiene polymer and (B) 70-5 wt. % of a diene rubber other than the end-modified butadiene polymer (A). The end-modified butadiene polymer (A) is obtained by reacting at least one compound to active terminals of a starting butadiene polymer having a trans 1,4 bond content of 70-95 wt. %. The at least one compound is selected from N-substituted aminoketones, N-substituted thioaminoketones, N-substituted amino-aldehydes, N-substituted thioaminoaldehydes and compounds containing in the molecules thereof an atomic group represented by the following formula:

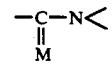

in which M stands for an oxygen or sulfur atom.

6 Claims, No Drawings

ABRASION-RESISTANT RUBBER COMPOSITIONS

FIELD OF THE INVENTION

The present invention relates to rubber compositions significantly improved in abrasion resistance, and more specifically to rubber compositions comprising an end-modified butadiene polymer, which contains trans-1,4 bonds at a high ratio and has specific atomic groups at active terminals, and a diene rubber other than the end-modified butadiene polymer.

BACKGROUND OF THE INVENTION

In rubber materials for large tires ranging from truck and bus tires to aircraft tires, diene rubbers have conventionally been used as principal materials. Among these diene rubbers, it is the common practice to use natural rubber for the improvement of the heat generation and breaking strength of tires, a styrene-butadiene copolymer rubber for the improvement of the abrasion resistance and cut resistance of tires, and a polybutadiene rubber for the improvement of the abrasion resistance of tires. There have been used rubber compositions with one or more of these rubber materials mixed in a suitable amount according to the purpose of improvement.

In particular, natural rubber is used principally in a rubber for tread parts of large tires because of substantially high loads applied to the tires. A polybutadiene rubber having a high cis content is generally blended further.

Abrasion resistance and crack resistance are both important properties for large tires. They are however contradictory to each other. In a mixture of a natural rubber and a polybutadiene rubber having a high cis content, a greater proportion of the polybutadiene rubber leads to an improvement in abrasion resistance but to a deterioration in crack resistance. While a smaller proportion of the polybutadiene results in insufficient abrasion resistance.

Extensive investigations have therefore been conducted to date on the improvement of polybutadiene rubbers, leading to many proposals. Exemplary proposals include a method in which a polybutadiene rubber having a wide molecular weight distribution is used to improve tack and/or green strength (Japanese Patent Application Laid-Open No. 45337/1984) and a method in which the molecular weight of a polybutadiene rubber is increased to improve abrasion resistance. These methods however are accompanied by the drawback that the processing characteristics are deteriorated although abrasion resistance is improved.

On the other hand, rubber compositions blended with a polybutadiene rubber having a high trans content are dealt with in Japanese Patent Application Laid-Open No. 197749/1985. Primary objects however reside in improvements in processing characteristics and cold flow characteristics but not in improvements in abrasion resistance. As a matter of fact, abrasion resistance is improved very little.

OBJECTS AND SUMMARY OF THE INVENTION

An object of the present invention is to provide a rubber composition not only excellent in breaking strength and abrasion resistance but also improved in the balancing between rolling resistance and wet skid resistance.

The present inventors have proceeded with a further extensive investigation based on the abovedescribed circumstances. As a result, it has been found that blending of an end-modified butadiene polymer, which contains trans-1,4 bonds at a high ratio and has been obtained by a reaction of its active terminals with a compound containing a specific atomic group therein, with a suitable amount of a diene rubber other than the polymer can provide excellent breaking strength, significantly improved abrasion resistance and good balancing between rolling resistance and wet skid resistance, leading to the completion of the present invention.

In one aspect of the present invention, there is thus provided an abrasion-resistant rubber composition comprising as rubber components:

(A) 30–95 wt. % of an end-modified butadiene polymer obtained by reacting at least one compound to active terminals of a starting butadiene polymer having a trans-1,4 bond content of 70–95 wt. %, said at least one compound being selected from N-substituted aminoketones, N-substituted thioaminoketones, N-substituted aminoaldehydes, N-substituted thioaminoaldehydes and compounds containing in the molecules thereof an atomic group represented by the following formula:

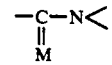

in which M stands for an oxygen or sulfur atom; and (B) 70–5 wt. % of a diene rubber other than the end-modified butadiene copolymer (A).

DETAILED DESCRIPTION OF THE INVENTION

Features of the present invention will hereinafter be described in detail.

Butadiene polymer

The butadiene polymer employed in the present invention has a trans-1,4 bond content of 70–95 wt. %, and therefore has a high trans bond content.

Trans-1,4 bond contents lower than 70 wt. % lead to a reduction in both breaking strength and abrasion resistance. The butadiene polymer having such a high trans-1,4 bond content can be obtained by polymerizing butadiene, usually, in the presence of a composite catalyst containing alkaline earth metals. It is however difficult to obtain those having a trans-1,4 bond content higher than 95 wt. %. The preferred trans-1,4 bond content is 75–95 wt. %, more preferably 85–95 wt. %.

Preferably, the butadiene polymer useful in the practice of the invention has, in accordance with measurement by GPC, a weight average molecular weight of about 150,000–500,000 as calibrated based on standard polystyrene. Further, the Mooney viscosity ($ML_{1+4}$, 100° C.; measured under JIS K-6301) may be at least 10, with 30 or higher being preferred. The upper limit may be about 150 or so when oil extension is taken into consideration. An unduly low weight average molecular weight or Mooney viscosity results in inferior strength characteristics.

The butadiene polymer useful in the practice of the present invention, which contain trans-1,4 bonds at a high ratio, can be obtained as described above by polymerizing butadiene, generally, using a composite catalyst containing alkaline earth metals.

Exemplary composite catalysts containing alkaline earth metals include catalyst systems composed principally of barium compound, strontium compound, calcium compound and/or the like, as disclosed in patent publications such as U.S. Pat. Nos. 3,946,385, 3,992,561, 4,079,176, 4,092,268, 4,112,210, 4,129,705, 4,260,519 and 4,297,240, although not necessarily limited thereto.

The catalyst can be used generally in an amount of 0.05-20 mmol, preferably 0.5-10 mmol, more preferably 1-7 mmol in terms of alkaline earth metal atoms per 100 g of the monomer.

Modification of active terminals

The present invention makes use of an end-modified butadiene polymer which is obtained by reacting a butadiene polymer, said polymer having active terminals after completion of its polymerization, with at least one compound selected from N-substituted aminoketones, N-substituted thioaminoketones, N-substituted aminoaldehydes, N-substituted thioaminoaldehydes and compounds containing in the molecules thereof an atomic group represented by the following formula:

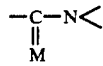

in which M stands for an oxygen or sulfur atom.

The use of the butadiene polymer having the high trans-1,4 bond content and subjected to the end modifications has made it possible for the first time to achieve excellent improvements in breaking strength and abrasion resistance and also improvements in the balancing between rolling resistance and wet skid resistance.

Exemplary organic compounds usable in this end-modifying reaction include N-substituted aminoketones such as 4-dimethylaminobenzophenone, 4-diethylaminobenzophenone, 4-di-t-butylaminobenzophenone, 4-diphenylaminobenzophenone, 4,4'-bis(dimethylamino)-benzophenone, 4,4'-bis(diethylamino)benzophenone, 4,4'-bis(di-t-butylamino)benzophenone, 4,4'-bis(diphenylamino)benzophenone, 4,4'-bis(divinylamino)benzophenone, 4-dimethylaminoacetophenone, 4-diethylaminoacetophenone, 1,3-bis(diphenylamino)-2-propanone and 1,7-bis(methylethylamino-4-heptanone, and their corresponding N-substituted aminothioketones; N-substituted aminoaldehydes such as 4-dimethylaminobenzaldehyde, 4-diphenylaminobenzaldehyde and 4-divinylaminobenzaldehyde, and their corresponding N-substituted aminothioaldehydes; N-substituted lactams such as N-methyl-β-propiolactam, N-t-butyl-β-propiolactam, N-methoxyphenyl-β-propiolactam, N-naphthyl-β-propiolactam, N-methyl-2-pyrrolidone, N-t-butyl-2-pyrrolidone, N-phenylpyrrolidone, N-methoxyphenyl-2-pyrrolidone, N-vinyl-2-pyrrolidone, N-benzyl-2-pyrrolidone, N-naphthyl-2-pyrrolidone, N-methyl-5-methyl-2-pyrrolidone, N-t-butyl-5-methyl-2-pyrrolidone, N-phenyl-5-methyl-2-pyrrolidone, N-methyl-3,3'-dimethyl-2-pyrrolidone, N-t-butyl-3,3'-dimethyl-2-pyrrolidone, N-phenyl3,3'-dimethyl-2-pyrrolidone, N-methyl-2-piperidone, N-t-butyl-2-pyrrolidone, N-phenyl-2-piperidone, N-methoxyphenyl-2-piperidone, N-vinyl-2-piperidone, N-benzyl-2-piperidone, N-naphthyl-2-piperidone, N-methyl-3,3'-dimethyl-2-piperidone, N-hexyl-3,3'-dimethyl-2-piperidone, N-methyl-ε-caprolactam, N-phenyl-ε-caprolactam, N-methoxyphenyl-ε-caprolactam, N-vinyl-ε-caprolactam, N-benzyl-ε-caprolactam, N-naphthyl-ε-caprolactam, N-methyl-ω-laurylolactam, N-phenyl-ω-laurylolactam, N-t-butyl-ω-laurylolactam, N-vinyl-ω-laurylolactam and N-benzyl-ω-lauryloctam, and their corresponding N-substituted thiolactams; as well as N-substituted ethyleneureas such as 1,3-dimethylethyleneurea, 1,3-diphenylethyleneurea, 1,3-di-t-butylethyleneurea and 1,3-divinylethyleneurea, and their corresponding N-substituted thioethyleneureas.

These compounds can be used generally in an amount of 0.05-10 moles, preferably 0.2-2 moles per mole of the polymerization catalyst to be employed.

After completion of the polymerization reaction, one of these compounds is added to the polymerization mixture, followed by an end-modifying reaction which generally proceeds for several seconds to several minutes at room temperature to 100° C. After completion of the reaction, the end-modified butadiene polymer is recovered from the reaction mixture by steam stripping or the like.

In the present invention, it is also possible to replace up to 30 wt. % of the polymer with another end-modified butadiene polymer which has been subjected to coupling with a coupling agent such as SnCl$_4$ or SiCl$_4$.

Rubber composition

The rubber composition according to the present invention contains, as a rubber component, a mixture of (A) the above end-modified butadiene polymer and (B) a diene rubber other than the polymer.

The proportion of the end-modified butadiene polymer (A) in the rubber component is 30-95 wt. %. Proportions smaller than 30 wt. % cannot improve abrasion resistance, whereas proportions greater than 95 wt. % lead to deteriorations in cut resistance and crack resistance in the case of rubbers used for large tires although abrasion resistance can be improved. The preferred proportion of the end-modified butadiene polymer (A) is 30-85 wt. %, with 40-80 wt. % being more preferred.

The proportion of the diene rubber (B) in the rubber component is 70-5 wt. %. Proportions higher than 70 wt. % cannot improve abrasion resistance, whereas proportions smaller than 5 wt. % lead to deteriorations in cut resistance and crack resistance when rubbers are used in large tires. The preferred proportion is 70-15 wt. %, with 60-20 wt. % being more preferred.

Examples of the diene rubbers (B) may include natural rubber, high-cis polybutadiene rubbers, low-cis polybutadiene rubbers, polyisoprene rubbers, butadienestyrene copolymer rubbers, butadiene-isoprene copolymer rubbers, halogenated butyl rubbers and the like, although not necessarily limited thereto.

The rubber composition according to the present invention is prepared by incorporating various compounding ingredients in the rubber component which is the mixture of (A) the end-modified butadiene polymer and (B) the diene rubber.

These various additives are mixed in the rubber component by using a mixing means such as a roll mill or Banbury mixer.

Such various additives can be chosen from those commonly employed in the rubber industry, in the light of the application purpose of the rubber composition, and no particular limitation is imposed on the additives. Described specifically, there are vulcanizing agents such as sulfur, stearic acid, zinc oxide, various vulcanization accelerators (thiazoles, thiurams, sulfenamides, etc.), and organic peroxides; reinforcing agents such as carbon blacks of various grades, e.g., HAF and ISAF, and silica; fillers such as calcium carbonate and talc; and other additives such as processing oils, processing aids, vulcanization retarders, and antioxidants.

In general, the kinds, combination and amounts of these additives can be suitably chosen depending on the application purpose of the rubber composition, and no particular limitation is imposed thereon.

ADVANTAGES OF THE INVENTION

The present invention can provide improved rubber compositions excellent in breaking strength and abrasion resistance and also enhanced in the balancing between rolling resistance and wet skid resistance.

The rubber compositions according to the present invention are suitable especially for treads of large tires.

EMBODIMENTS OF THE INVENTION

The present invention will hereinafter be described specifically by the following examples and comparative examples, in which all designations of "part" or "parts" and "%" are on a weight basis unless otherwise specifically indicated.

Examples 1–13 & Comparative Examples 1–6

Butadiene polymers

In each of the examples and comparative examples, a polymerization reactor constructed of a stainless steel bottle having an internal capacity of 1.4 l was washed, dried and then purged with dry nitrogen. The reactor was charged with 120 g of 1,3-butadiene and then with 600 g of cyclohexane.

Added next were 3.3 mmol of a dibutyl magnesium/triethyl aluminum complex (Mg/Al molar ratio: 5.0) and 0.50 mmol of t-butoxy barium. It is however to be noted that the amount of the dibutyl magnesium/triethyl aluminum complex is indicated in terms of magnesium.

The contents of the polymerization reactor were subjected to polymerization under stirring at 80° C. for 5 hours. After completion of the polymerization reaction, the corresponding reactant specified in Table 1 was added in an amount of 5.0 mmole, followed by an addition reaction (end-modifying reaction) for 60 minutes.

Thereafter, the polymer solution in the polymerization reactor was poured into a methanol solution, which contained 2,6-di-t-butyl-p-cresol (BHT) at a concentration of 1.5 wt. %, to solidify the resultant polymer, followed by drying at 60° C. for 24 hours under reduced pressure.

In each of the examples in which no end modification was conducted, the corresponding dry polymer was obtained in a similar manner except that, after completion of the polymerization reaction, no reactant was added and no addition reaction was conducted.

Measurement results of the trans-1,4 bond content of the butadiene polymer obtained in the abovedescribed manner are shown together with its Mooney viscosity $(ML_{1+4}, 100°$ C.) in Table 1. The trans-1,4 bond content of the butadiene polymer was determined by the Molero method, using an infrared spectrometer.

Rubber compositions

In each of the examples and comparative examples, a rubber composition was obtained by using the corresponding polymer in Table 1 and mixing a rubber mixture of the polymer and the corresponding diene rubber, which is given in the corresponding table of Tables 3–6, as a rubber component with the various additives in the respective proportions specified in Table 2 in a 250ml mixer of the Brabender type. The rubber composition was vulcanized under pressure at 160° C. or 20 minutes, whereby its test pieces were formed. Physical properties of the thus-vulcanized material were measured

TABLE 2

| (Formulation) | |
|---|---|
| Rubber component | 100 parts |
| Zinc white | 3 parts |
| Stearic acid | 2 parts |
| HAF carbon black | 50 parts |
| Aromatic oil | 5 parts |
| Accelerator, MSA* | 1.1 parts |
| Sulfur | 1.5 parts |

*N-Oxydiethylene-2-benzothiazylsulfenamide

The diene rubbers shown in Tables 3–6 are as follows:

High-cis polybutadiene rubber having a 98 % cis content: "Nipol BR-1220"; product of Nippon Zeon Co., Ltd.; Tg: −115° C.

Styrene-butadiene copolymer rubber: "Nipol SBR-1502"; product of Nippon Zeon Co., Ltd.; Tg: −58° C.

Natural rubber: "NR RSS#3"; Tg −67° C.

Low-cis polybutadiene rubber: "Nipol BR-1250"; product of Nippon Zeon Co., Ltd.; trans content: 54%; Tg: −99° C.

The results of the examples and comparative examples are summarized in Table 3 through Table 6.

Incidentally, the following evaluation methods were employed.

Breaking strength (tensile strength)

Measured under JIS K-6301.

Rebound

Measured at 60° C. using a Dunlop tripsometer. The value of the measurement was then converted to an index of rolling resistance.

Abrasion resistance

Measured by Pico abrader under ASTM-D-2228. The value of the measurement was then converted to an index.

Wet skid resistance

Measured at 23° C. on a road surface specified in ASTM-E-303-74, using a portable skid tester. The value of the measurement was then converted to an index.

As is shown in Table 3 through Table 6, the rubber compositions of the present invention are improved in breaking strength (tensile strength) and abrasion resistance and also in the balancing between wet skid resistance and rolling resistance over the rubber compositions of the comparative examples. In particular, the improvements in abrasion resistance are substantial.

TABLE 1

| Polymer | Reactant | Content of trans form (%) | $ML_{1+4}$ (100° C.) |
|---|---|---|---|
| A | N-Methyl-2-pyrrolidone | 91.5 | 35.4 |
| B | N-Vinyl-2-pyrrolidone | 91.2 | 36.5 |
| C | N-Methyl-ε-caprolactam | 91.7 | 35.8 |
| D | Dimethyl-imidazolidinone | 91.1 | 37.2 |
| E | None | 91.2 | 31.4 |

TABLE 3

| Composition | Ex. 1 | Ex. 2 | Ex. 3 | Ex. 4 | Comp. Ex. 1 | Comp. Ex. 2 |
|---|---|---|---|---|---|---|
| Polymer A | 80 | | | | | |
| Polymer B | | 80 | | | | |
| Polymer C | | | 80 | | | |
| Polymer D | | | | 80 | | |
| Polymer E | | | | | 80 | |
| Nipol BR-1220 | | | | | | 80 |
| NR RSS#3 | 20 | 20 | 20 | 20 | 20 | 20 |
| Tensile strength (kg/cm²) | 263 | 255 | 262 | 275 | 196 | 216 |
| Abrasion resistance | 130 | 137 | 148 | 145 | 97 | 100 |
| Wet skid resistance | 113 | 111 | 112 | 110 | 110 | 100 |
| Rolling resistance (index, 60° C.) | 102 | 102 | 102 | 102 | 89 | 100 |

TABLE 4

| Composition | Comp. Ex. 3 | Example 5 | Example 6 | Example 7 | Comp. Ex. 4 |
|---|---|---|---|---|---|
| Polymer C | 100 | 70 | 50 | 30 | |
| NR RSS#3 | | 30 | 50 | 70 | 100 |
| Tensile strength (kg/cm²) | 277 | 279 | 288 | 290 | 288 |
| Abrasion resistance | 342 | 319 | 279 | 225 | 100 |
| Wet skid resistance | 90 | 95 | 98 | 102 | 100 |
| Rolling resistance (index, 60° C.) | 102 | 102 | 101 | 101 | 100 |

TABLE 5

| Composition | Example 8 | Example 9 | Example 10 | Comp. Ex. 5 |
|---|---|---|---|---|
| Polymer C | 80 | 50 | 20 | |
| Nipol BR-1220 | 20 | 50 | 80 | 100 |
| Tensile strength (kg/cm²) | 254 | 243 | 240 | 200 |
| Abrasion resistance | 142 | 136 | 130 | 100 |
| Wet skid resistance | 114 | 109 | 105 | 100 |
| Rolling resistance (index, 60° C.) | 102 | 102 | 101 | 100 |

TABLE 6

| Composition | Example 11 | Example 12 | Example 13 | Comp. Ex. 6 |
|---|---|---|---|---|
| Polymer C | 80 | 50 | 30 | |
| Nipol SBR-1502 | 20 | 50 | 70 | 100 |
| Tensile strength (kg/cm²) | 270 | 264 | 250 | 260 |
| Abrasion resistance | 312 | 278 | 242 | 100 |
| Wet skid resistance | 82 | 90 | 93 | 100 |
| Rolling resistance (index, 60° C.) | 121 | 113 | 110 | 100 |

Examples 14–17 & Comparative Examples 7–9

In each of the examples and comparative examples, the corresponding butadiene polymer shown in Table 7 was prepared by using the same catalyst as that employed in Example 1 and in a manner similar to Example 1.

The polymer thus obtained was mixed with the corresponding diene rubber shown in Table 5. Using the resulting rubber component, a blend rubber composition was prepared in accordance with the blending formulation shown in Table 2. The rubber composition was vulcanized at 160° C. for 20 minutes under pressure, whereby test pieces were formed, and the physical properties of the thus-vulcanized material were measured.

The results are summarized in Table 8.

As is apparent from Table 8, the rubber compositions of the present invention retain tensile strength at a high level and are improved in abrasion resistance and also in the balancing between wet skid resistance and rolling resistance. In particular, the improvements in abrasion resistance are substantial.

TABLE 7

| Polymer | Reactant | Content of trans form (%) | $ML_{1+4}$ (100° C.) |
|---|---|---|---|
| F | N-Methyl-ε-caprolactam | 84.7 | 37.3 |
| G | N-Methyl-ε-caprolactam | 81.8 | 39.5 |
| H | Dimethyl-imidazolidinone | 78.4 | 43.6 |
| I | N-Methyl-ε-caprolactam | 65.7 | 56.2 |

TABLE 8

| Composition | Ex. 14 | Ex. 15 | Ex. 16 | Ex. 17 | Comp. Ex. 7 | Comp. Ex. 8 | Comp. Ex. 9 |
|---|---|---|---|---|---|---|---|
| Polymer C | 80 | | | | | | |
| Polymer F | | 80 | | | | | |
| Polymer G | | | 80 | | | | |
| Polymer H | | | | 80 | | | |
| Polymer I | | | | | 80 | | |
| Nipol BR-1250 | | | | | | 80 | |
| Nipol BR-1220 | | | | | | | 80 |
| NR RSS#3 | 20 | 20 | 20 | 20 | 20 | 20 | 20 |
| Tensile strength (kg/cm²) | 276 | 273 | 265 | 258 | 185 | 167 | 216 |
| Abrasion resistance | 148 | 143 | 139 | 140 | 97 | 114 | 100 |
| Wet skid resistance | 115 | 113 | 114 | 111 | 110 | 105 | 100 |
| Rolling resistance (index, 60° C.) | 102 | 102 | 100 | 100 | 87 | 106 | 100 |

We claim:

1. An abrasion-resistant rubber composition comprising as rubber components:
   (A) 30–95 wt. % of an end-modified butadiene polymer obtained by reacting at least one compound to active terminals of a starting butadiene polymer having a trans-1,4 bond content of 70–95 wt. %, said at least one compound being selected from N-substituted aminoketones, N-substituted thioaminoketones, N substituted aminoaldehydes, N-substituted thioaminoaldehydes and compounds containing in the molecules thereof an atomic group represented by the following formula

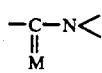

in which M stands for an oxygen or sulfur atom; and
   (B) 70–5 wt. % of a diene rubber other than the end-modified butadiene polymer (A).

2. The composition of claim 1, wherein the starting butadiene polymer has a trans-1,4 bond content of 70–95 wt. % and has a weight average molecular weight of 150,000–500,000 and a Mooney viscosity ($ML_{1+4}$, 100° C.) of 10–150.

3. The composition of claim 1, wherein the end-modified butadiene polymer (A) has been obtained by using said at least one compound in a proportion of 0.05–10 moles per mole of a catalyst employed upon production of the starting butadiene polymer.

4. The composition of claim 1, wherein the compounds containing in the molecules thereof an atomic group represented by the formula,

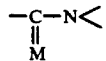

are N-substituted lactams, N-substituted thiolactams, N-substituted ethyleneureas and N-substituted thioethyleneureas.

5. The composition of claim 1, wherein the diene rubber (B) is at least one rubber selected from natural rubber, high-cis polybutadiene rubbers, low-cis polybutadiene rubbers, polyisoprene rubbers, butadiene-styrene copolymer rubbers, halogenated butyl rubbers and butadiene-isoprene copolymer rubbers.

6. The composition of claim 1, comprising 30–85 wt. % of the end-modified butadiene polymer (A) and 70–15 wt. % of the diene rubber (B).

* * * * *